United States Patent [19]
Ko

[11] Patent Number: 6,066,195
[45] Date of Patent: May 23, 2000

[54] ACCESSORY FOR DUCT SYSTEMS

[76] Inventor: Ellick Yiu-Cho Ko, 5702 Glen Erin Drive, Mississauga, Ontario, Canada, L5M 5J2

[21] Appl. No.: 09/112,694

[22] Filed: Jul. 9, 1998

[51] Int. Cl.[7] .................................................. B01D 45/08
[52] U.S. Cl. ................................ 96/416; 15/353; 55/445; 55/481; 55/506
[58] Field of Search ............................. 55/307, 308, 445, 55/446, 481, 506, 503, 504, 505, 511; 96/416, 415; 15/353, 347

[56] References Cited

U.S. PATENT DOCUMENTS

| | | | |
|---|---|---|---|
| 858,607 | 7/1907 | Krautzberger | 55/481 |
| 1,952,989 | 3/1934 | Joseph | 55/481 |
| 3,494,113 | 2/1970 | Kinney | 55/481 |
| 4,171,210 | 10/1979 | Miller | 55/481 |
| 4,341,540 | 7/1982 | Howerin | 55/307 |
| 4,416,673 | 11/1983 | Kirchen et al. | 55/446 |
| 4,717,404 | 1/1988 | Fore | 55/446 |
| 4,773,922 | 9/1988 | Ross et al. | 55/481 |
| 5,000,768 | 3/1991 | Hwang | 55/308 |
| 5,211,729 | 5/1993 | Sherman | 55/308 |

*Primary Examiner*—Duane S. Smith

[57] ABSTRACT

A new accessory for duct systems for displaying the degree dustiness in a duct network and for trapping heavy and potentially valuable objects as they are cleaned from a duct network. The inventive device includes a housing that has an exterior wall and an open top. The exterior wall has an interior surface that defines an interior of the housing. The open top provides an opening into the interior of the housing. A filter sheet is disposed in the interior of the housing. The filter sheet has a plurality of apertures therethrough. The filter sheet divides the interior of the housing into a first chamber and a second chamber. The exterior wall of the housing has an aperture into the first chamber and an aperture into the second chamber. A cover is dimensioned for coupling with the open top of the housing. The cover closes the opening into the interior of the housing.

20 Claims, 2 Drawing Sheets

ACCESSORY FOR DUCT SYSTEMS

BACKGROUND OF THE INVENTION

1. Field of the Invention

The present invention relates to air filters and more particularly pertains to a new accessory for duct systems for trapping heavy and potentially valuable objects as they are cleaned from a duct network and for displaying the degree of dustiness in a duct network.

2. Description of the Prior Art

The use of air filters is known in the prior art. More specifically, air filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art air filters include U.S. Pat. No. 4,488,889 to McCarrol; U.S. Pat. No. 5,217,513 to Armbruster; U.S. Pat. No. 5,238,476 to Svensson et al.; U.S. Pat. No. 4,438,057 to Sundseth; U.S. Pat. No. Des. 344,328 to Price; and U.S. Pat. No. 4,640,698 to Ohishi.

While these devices fulfill their respective, particular objectives and requirements, the aforementioned patents do not disclose a new accessory for duct systems. The inventive device includes a housing that has an exterior wall and an open top. The exterior wall has an interior surface that defines an interior of the housing. The open top provides an opening into the interior of the housing. A filter sheet is disposed in the interior of the housing. The filter sheet has a plurality of apertures therethrough. The filter sheet divides the interior of the housing into a first chamber and a second chamber. The exterior wall of the housing has an aperture into the first chamber and an aperture into the second chamber. A cover is dimensioned for coupling with the open top of the housing. The cover closes the opening into the interior of the housing.

In these respects, the accessory for duct systems according to the present invention substantially departs from the conventional concepts and designs of the prior art, and in so doing provides an apparatus primarily developed for the purpose of trapping heavy and potentially valuable objects as they are cleaned from a duct network and displaying the degree of dustiness in the duct network.

SUMMARY OF THE INVENTION

In view of the foregoing disadvantages inherent in the known types of air filters now present in the prior art, the present invention provides a new accessory for duct systems construction wherein the same can be utilized for trapping heavy and potentially valuable objects as they are cleaned from a duct network and displaying the degree of dustiness in the duct network, on the filter sheet.

The general purpose of the present invention, which will be described subsequently in greater detail, is to provide a new accessory for duct systems apparatus and method which has many of the advantages of the air filters mentioned heretofore and many novel features that result in a new accessory for duct systems which is not anticipated, rendered obvious, suggested, or even implied by any of the prior art air filters, either alone or in any combination thereof.

To attain this, the present invention generally comprises a housing that has an exterior wall and an open top. The exterior wall has an interior surface that defines an interior of the housing. The open top provides an opening into the interior of the housing. A filter sheet is disposed in the interior of the housing. The filter sheet has a plurality of apertures therethrough. The filter sheet divides the interior of the housing into a first chamber and a second chamber. The exterior wall of the housing has an aperture into the first chamber and an aperture into the second chamber. A cover is dimensioned for coupling with the open top of the housing. The cover closes the opening into the interior of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new accessory for duct systems apparatus and method which has many of the advantages of the air filters mentioned heretofore and many novel features that result in a new accessory for duct systems which is not anticipated, rendered obvious, suggested, or even implied by any of the prior art air filters, either alone or in any combination thereof.

It is another object of the present invention to provide a new accessory for duct systems which may be easily and efficiently manufactured and marketed.

It is a further object of the present invention to provide a new accessory for duct systems which is of a durable and reliable construction.

An even further object of the present invention is to provide a new accessory for duct systems which is susceptible of a low cost of manufacture with regard to both materials and labor, and which accordingly is then susceptible of low prices of sale to the consuming public, thereby making such accessory for duct systems economically available to the buying public.

Still yet another object of the present invention is to provide a new accessory for duct systems which provides in the apparatuses and methods of the prior art some of the advantages thereof, while simultaneously overcoming some of the disadvantages normally associated therewith.

Still another object of the present invention is to provide a new accessory for duct systems for trapping heavy and potentially valuable objects as they are cleaned from a duct network and displaying and alerting premise owners of the degree of dustiness in the duct network being cleaned.

Yet another object of the present invention is to provide a new accessory for duct systems which includes a housing that has an exterior wall and an open top. The exterior wall has an interior surface that defines an interior of the housing, The open top provides an opening into the interior of the housing. A filter sheet is disposed in the interior of the housing. The filter sheet has a plurality of apertures therethrough. The filter sheet divides the interior of the housing into a first chamber and a second chamber. The exterior wall of the housing has an aperture into the first chamber and an aperture into the second chamber. A cover is dimensioned for coupling with the open top of the housing. The cover closes the opening into the interior of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
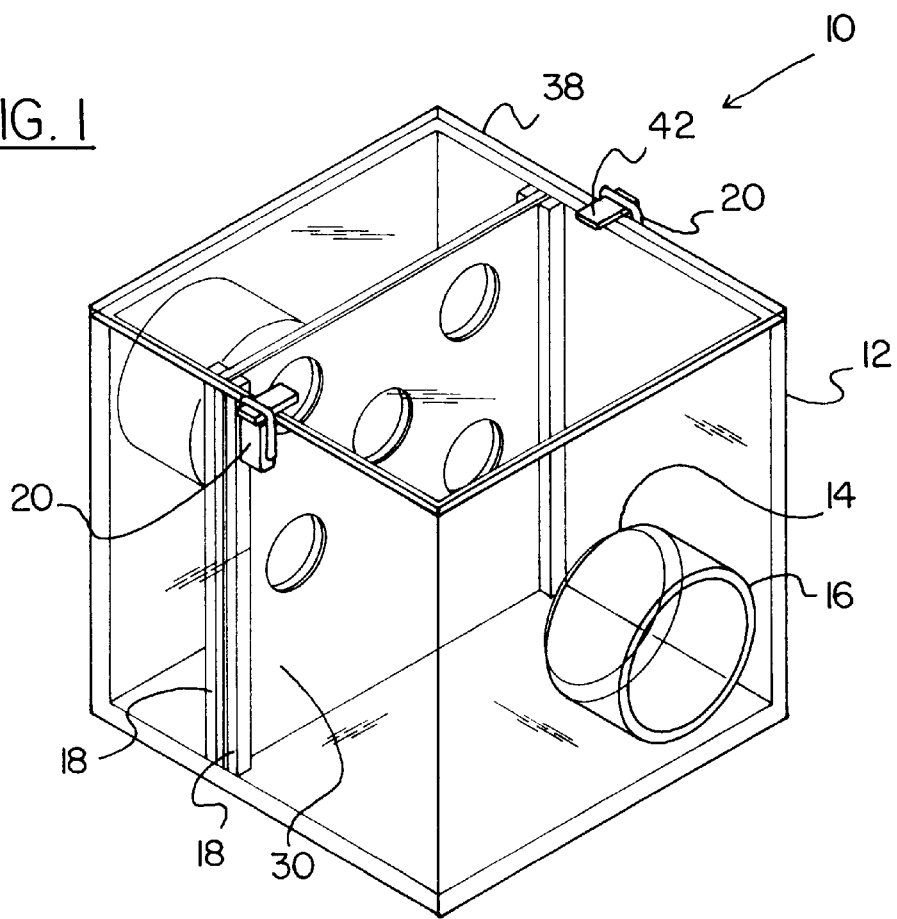
FIG. 1 is a perspective view of a new accessory for duct systems according to the present invention.
Figure 2:
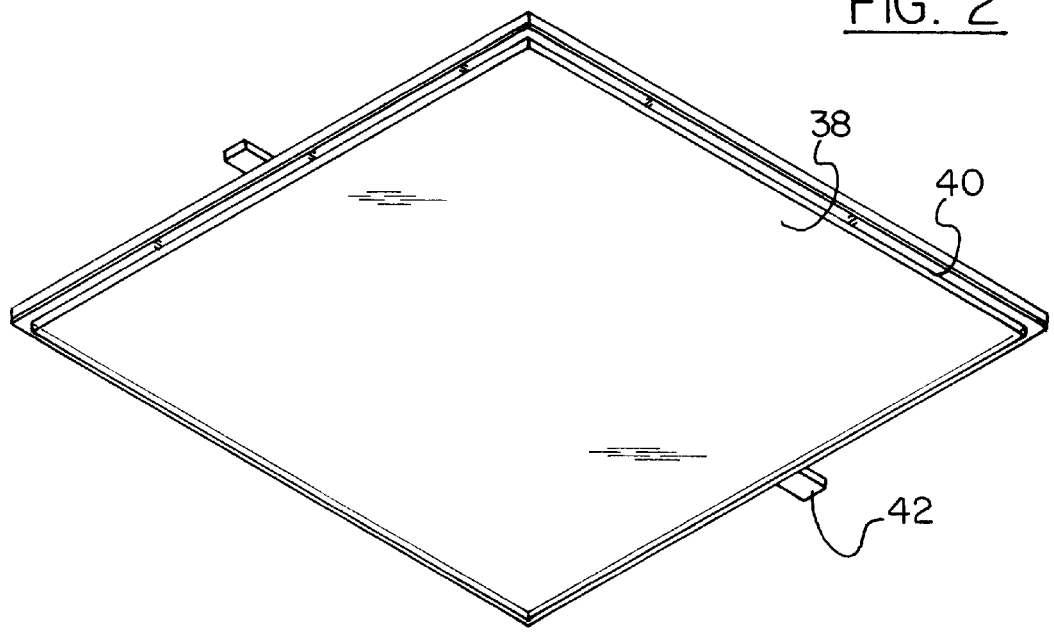
FIG. 2 is a perspective view of the cover of the present invention.
Figure 3:
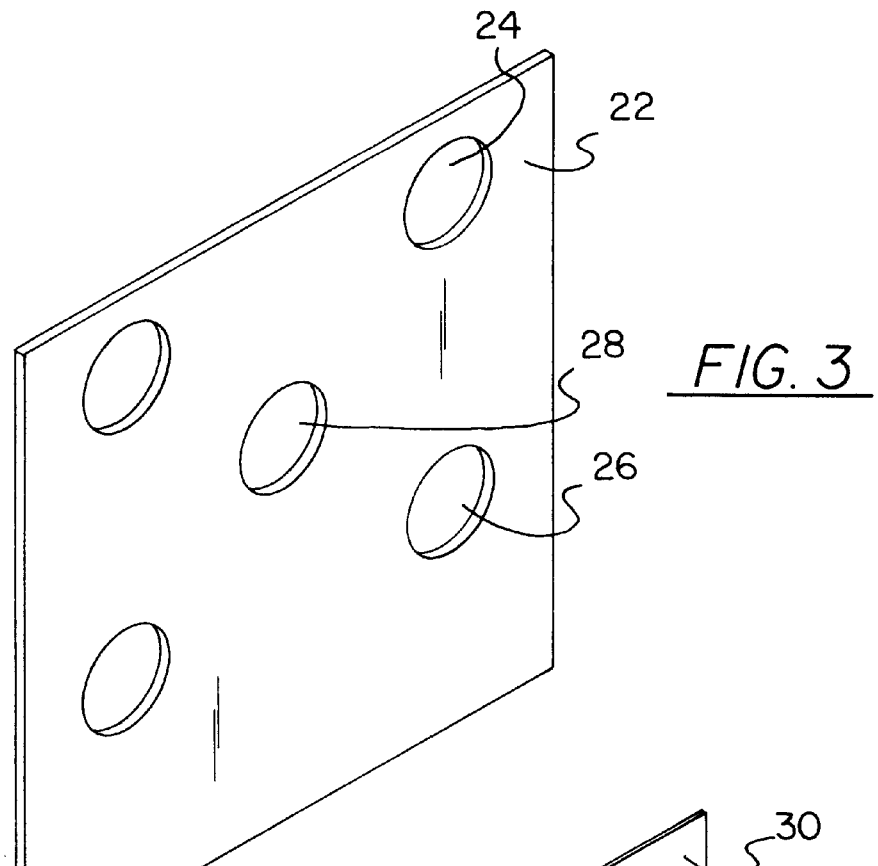
FIG. 3 is a perspective view of the insert sheet of the present invention.
Figure 4:
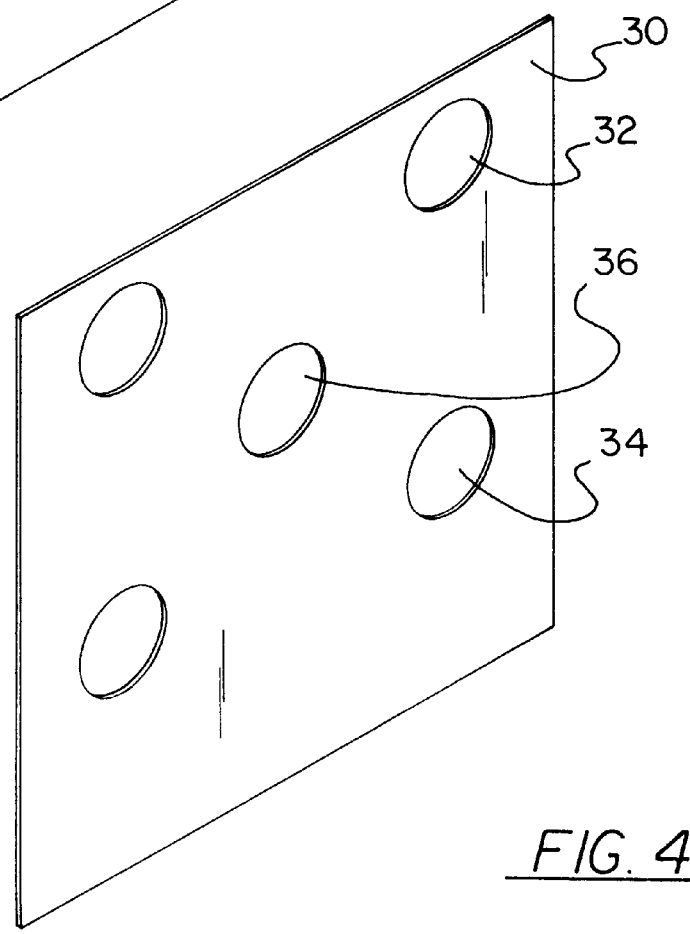
FIG. 4 is a perspective view of the filter sheet of the present invention.

With reference now to the drawings, and in particular to FIGS. 1 through 4 thereof, a new accessory for duct systems embodying the principles and concepts of the present invention and generally designated by the reference numeral 10 will be described.

As best illustrated in FIGS. 1 through 4, the accessory for duct systems 10 comprises a housing 12 that has an exterior wall and an open top. The exterior wall has an interior surface that defines an interior of the housing 12. The open top provides an opening into the interior of the housing. A filter sheet 30 is disposed in the interior of the housing 12. The filter sheet 30 has a plurality of apertures 32, 34, 36 therethrough. The filter sheet 30 divides the interior of the housing 12 into a first chamber and a second chamber. The exterior wall of the housing 12 has an aperture 14 into the first chamber and an aperture 14 into the second chamber. A cover 38 is dimensioned for coupling with the open top of the housing 12. The cover 38 closes the opening into the interior of the housing 12.

Preferably, the housing 12 is fabricated of a transparent material so that a user can visually estimate the amount of dust and debris that has accumulated in the duct network. Also preferably, the housing 12 has an opposing pair of closely spaced parallel ribs 18 that extend from the interior surface of the exterior wall of the housing 12.

Also preferably, the accessory for duct systems 10 further comprises an insert sheet 22 that is disposed in the interior of the housing 12 adjacent the filter sheet 30. The insert sheet 22 has a plurality of apertures 24, 26, 28 therethrough in alignment with the apertures 32, 34, 36 of the filter sheet 30.

Most preferably, the insert sheet 22 and the filter sheet 30 each have five apertures therethrough. Ideally, the filter sheet and the insert sheet each have a pair of upper apertures 32, 24, a pair of lower apertures 34, 26 and a central aperture 36, 28. Even more ideally, the five apertures are disposed through an upper ¾'s of the insert sheet 22 and the filter sheet 30.

Ideally, the filter sheet 30 is flexible and the insert sheet 22 is rigid.

Preferably, the cover 38 has a fixed separation that extends downwardly therefrom. The separation is aligned substantially parallel the filter sheet 30 and engages the filter sheet 30 to prevent the flow of air between the filter sheet 30 and the cover 38. Alternately, the cover 38 has a gasket 40 that is substantially coextensive with an outer perimeter of the cover 38. The gasket 40 engages the filter sheet 30 to prevent the flow of air between the filter sheet 30 and the cover 38.

Also preferably, each of the apertures 14 into the chambers of the interior of the housing 12 has a sleeve 16 extending from it. The sleeves 16 of the present invention 10 can be round or could be formed in other shapes.

Preferably, the housing 12 has an opposing pair of closely spaced parallel ribs 18 that extend from the interior surface of the exterior wall of the housing 12. The insert sheet 22 and the filter sheet 30 are slidably received between the parallel ribs 18. Alternately, the insert member 22 is molded or permanently attached to the interior surface of the housing 12. In such an embodiment, the parallel ribs 18 are more closely spaced to receive only the filter sheet 30.

In one embodiment, the housing 12 has a cubic configuration. In such an embodiment, the housing 12 is defined by an open top, a closed bottom, a front wall, a back wall and opposed side walls. The front wall and the back wall each have an aperture 14 through a central portion thereof. The apertures 14 each have a cylindrical sleeve 16 extending outwardly therefrom. Interior surfaces of the opposed side walls each have a pair of closely spaced parallel ribs 18 extending from the open top to the closed bottom disposed inwardly of the back wall. Exterior surfaces of the opposed side walls each have a pivoting latch member 20 secured thereto disposed downwardly of the open top. The cover member 38 has a pair of tabs 42 extending outwardly from opposing side edges thereof. The pair of tabs 42 engage the pivoting latch members 20 of the housing 12 for securement of the cover 38 to the housing 12. Alternately, the housing 12 can take on a cylindrical shape. Optionally, the cover 38 may be threadedly coupled to the open top of the housing 12.

In use, the sleeves 16 allow the device 10 to be spliced into an existing duct system. The flexible filter sheet 30 darkens as dust lands on its surface, while dusty air is passing in from an aperture 14 via a sleeve 16. The majority of dust will pass through the apertures 24, 26, 28, 32, 34, 36 on the rigid insert sheet 22 and the flexible filter sheet 30, and leave the housing 12 via the other aperture 14. The minority of dust will land on the surface of the filter sheet 30. The filter sheet 30 darkens from light gray to dark gray, thereby indicating the degree of dustiness in the duct network. From the scale of light gray to dark gray, one may be able to estimate the amount of dust that needs been cleared out of the duct network.

In another use, the sleeves 16 allow the device 10 to be spliced inline in the hose of a duct cleaning system. The present invention would not interfere with the normal use of the duct cleaning system. It would, however, provide an effective means of trapping heavy and potentially valuable objects, such as jewelry, as they are cleaned from a duct network. The apertures will allow smaller objects to pass through the present invention, but larger objects will be precluded from being sucked outwardly of the housing 12 and can be easily retrieved by lifting off the cover 38 after the duct cleaning system is turned off. The flexible filter sheet 30 darkens as dust lands on its surface, while dusty air is passing in from an aperture 14 via a sleeve 16. The majority of dust will pass through the apertures 24, 26, 28, 32, 34, 36 on the rigid insert sheet 22 and the flexible filter sheet, and leaving the housing 12 via the other aperture 14. The minority of dust will land on the surface of the filter sheet 30. The filter sheet 30 darkens from light gray to dark gray, thereby indicating the degree of dustiness in the duct network. From the scale of light gray to dark gray, one may be able to estimate the amount of dust that has been cleared out of the duct network.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A accessory for duct systems for displaying the degree of dustiness in a duct network and for trapping heavy and potentially valuable objects as they arc cleaned from a duct network comprising, in combination:

a housing having an exterior wall and an open top the exterior wall having an interior surface defining, an interior of the housing the open top providing an opening into the interior of the housing, the housing being fabricated of a transparent material;

the housing having an opposing pair of closely spaced parallel ribs extending from the interior surface of the exterior wall of the housing;

a flexible filter sheet slidably received between the parallel ribs of the opposed side walls of the housing, the filter sheet having five apertures therethrough including a pair of upper apertures, a pair of lower apertures and a central aperture, the five apertures being disposed through an upper ¾'s of the filter sheet;

a rigid insert sheet slidably received between the parallel ribs of the opposed side walls of the housing adjacent the filter sheet, the insert sheet having five apertures therethrough including a pair of upper apertures, a pair of lower apertures and a central aperture in alignment with the five apertures of the filter sheet, the five apertures being disposed through an upper ¾'s of the insert sheet;

wherein the filter sheet divides the interior of the housing into a first chamber and a second chamber, the exterior wall of the housing having an aperture into the first chamber, the exterior wall of the housing having an aperture into the second chamber;

the apertures into the chambers of the interior of the housing each having a cylindrical sleeve extending outwardly therefrom; and a cover dimensioned for coupling with the open top of the housing, the cover member having a fixed separation extending downwardly therefrom, the separation being aligned substantially parallel the filter sheet, the separation engaging the filter sheet.

2. A accessory for duct systems for displaying the degree of dustiness in a duct network and for trapping heavy and potentially valuable objects as they are cleaned from a duct network comprising, in combination:

a housing having an exterior wall and an open top, the exterior wall having an interior surface defining an interior of the housing, the open top providing an opening into the interior of the housing;

a filter sheet being disposed in the interior of the housing, the filter sheet having a plurality of apertures therethrough;

wherein the filter sheet divides the interior of the housing into a first chamber and a second chamber, the exterior wall of the housing having an aperture into the first chamber, the exterior wall of the housing having an aperture into the second chamber;

a cover dimensioned for coupling with the open top of the housing, the cover closing the opening into the interior of the housing; and an insert sheet being disposed in the interior of the housing adjacent the filter sheet, the insert sheet having a plurality of apertures therethrough in alignment with the apertures of the filter sheet, the insert sheet and the filter sheet have five apertures therethrough including a pair of upper apertures, a pair of lower apertures and a central aperture.

3. The accessory for duct systems as set forth in claim 2 wherein the housing is fabricated of a transparent material.

4. The accessory for duct systems as set forth in claim 2 wherein the five apertures are disposed through an upper ¾'s of the insert sheet and the filter sheet.

5. The accessory for duct systems as set forth in claim 2 wherein the cover has a fixed separation extending downwardly therefrom, the separation being aligned substantially parallel the filter sheet, the separation engaging the filter sheet.

6. The accessory for duct systems as set forth in claim 2 wherein each of the apertures into the chambers of the interior of the housing has a sleeve extending therefrom.

7. The accessory for duct systems as set forth in claim 2 wherein the housing has an opposing pair of closely spaced parallel ribs extending from the interior surface of the exterior wall of the housing, the filter sheet being slidably received between the parallel ribs.

8. The accessory for duct systems as set forth in claim 2 wherein the housing has an opposing pair of closely spaced parallel ribs extending from the interior surface of the exterior wall of the housing the insert sheet and the filter sheet being slidably received between the parallel ribs.

9. The accessory for duct systems as set forth in claim 2 wherein the filter sheet is flexible.

10. The accessory for duct systems as set forth in claim 2 wherein the insert sheet is rigid.

11. A accessory for duct systems for displaying the degree of dustiness in a duct network and for trapping heavy and potentially valuable objects as they are cleaned from a duct network comprising, in combination:
   a housing having an exterior wall and an open top, the exterior wall having an interior surface defining an interior of the housing, the open top providing an opening into the interior of the housing;
   a filter sheet being disposed in the interior of the housing, the filter sheet having a plurality of apertures therethrough the filter sheet being flexible;
   wherein the filter sheet divides the interior of the housing into a first chamber and a second chamber, the exterior wall of the housing having all aperture into the first chamber, the exterior wall of the housing having an aperture into the second chamber; and
   a cover dimensioned for coupling with the open top of the housing, the cover closing the opening into the interior of the housing.

12. The accessory for duct systems as set forth in claim 11 further comprising an insert sheet being disposed in the interior of the housing adjacent the filter sheet, the insert sheet having a plurality of apertures therethrough in alignment with the apertures of the filter sheet.

13. The accessory for duct systems as set forth in claim 11 wherein the housing is fabricated of a transparent material.

14. The accessory for duct systems as set forth in claim 12 wherein the insert sheet and the filter sheet have five apertures therethrough including a pair of upper apertures, a pair of lower apertures and a central aperture.

15. The accessory for duct systems as set forth in claim 11 wherein the cover has a fixed separation extending downwardly therefrom, the separation being aligned substantially parallel the filter sheet, the separation engaging the filter sheet.

16. The accessory for duct systems as set forth in claim 11 wherein each of the apertures into the chambers of the interior of the housing has a sleeve extending therefrom.

17. The accessory for duct systems as set forth in claim 11 wherein the housing has an opposing pair of closely spaced parallel ribs extending from the interior surface of the exterior wall of the housing, the filter sheet being slidably received between the parallel ribs.

18. The accessory for duct systems as set forth in claim 12 wherein the housing has an opposing pair of closely spaced parallel ribs extending from the interior surface of the exterior wall of the housing, the insert sheet and the filter sheet being slidably received between the parallel ribs.

19. The accessory for duct systems as set forth in claim 12 wherein the insert sheet is rigid.

20. An accessory for duct systems for displaying the degree of dustiness in a duct network and for trapping heavy and potentially valuable objects as they are cleaned from a duct network comprising, in combination:
   a housing having an exterior wall and an open top, the exterior wall having an interior surface defining an interior of the housing, the open top providing an opening into the interior of the housing;
   a filter sheet being disposed in the interior of the housing, the filter sheet having a plurality of apertures therethrough;
   wherein the filter sheet divides the interior of the housing into a first chamber and a second chamber, the exterior wall of the housing having an aperture into the first chamber, the exterior wall of the housing having an aperture into the second chamber;
   a cover dimensioned for coupling with the open top of the housing, the cover closing the opening into the interior of the housing; and
   wherein the filter sheet is flexible.

* * * * *